United States Patent [19]
Ishikawa et al.

[11] Patent Number: 5,067,198
[45] Date of Patent: Nov. 26, 1991

[54] WIPER PIVOT

[75] Inventors: Masaru Ishikawa; Yuichi Ito, both of Yokohama, Japan

[73] Assignee: Jidosha Denki Kogyo K.K., Kanagawa, Japan

[21] Appl. No.: 434,960

[22] Filed: Nov. 9, 1989

[30] Foreign Application Priority Data

Nov. 11, 1988 [JP] Japan .................. 63-147177[U]

[51] Int. Cl.$^5$ .............................................. B60S 1/04
[52] U.S. Cl. ...................... 15/250.34; 15/250.31; 74/43; 384/480; 384/539; 403/289; 403/134
[58] Field of Search .......... 15/250.34, 250.30, 250.35, 15/250.31; 384/203, 209, 210, 486, 480, 539; 403/122, 133, 289, 290, 141, 134; 74/42, 43

[56] References Cited

U.S. PATENT DOCUMENTS

| | | | |
|---|---|---|---|
| 2,878,506 | 3/1959 | Krohm | 15/250.31 |
| 3,115,375 | 12/1963 | Holler | 384/206 |
| 3,226,141 | 12/1965 | Sullivan, Jr. | 384/203 |
| 3,298,754 | 1/1967 | Riester | 384/203 |
| 3,554,620 | 1/1971 | Dalton | 384/486 |
| 3,589,779 | 6/1971 | Sokol | 384/208 |
| 3,787,127 | 1/1974 | Cutler | 403/133 |
| 3,861,812 | 1/1975 | Ito | 403/141 |
| 3,909,084 | 9/1975 | Snider et al. | 384/203 |
| 4,448,562 | 5/1984 | Rose | 403/134 |
| 4,591,276 | 5/1986 | Schneider et al. | 384/203 |
| 4,701,064 | 10/1987 | Mizusawa | 403/141 |
| 4,843,898 | 7/1989 | Ishikawa | 15/250.34 |
| 4,914,777 | 4/1990 | Cartellone | 403/122 |

FOREIGN PATENT DOCUMENTS 0018750 1/1989 Japan .................. 145/250.31

Primary Examiner—Harvey C. Hornsby
Assistant Examiner—Gary Graham
Attorney, Agent, or Firm—Sughrue, Mion, Zinn, Macpeak & Seas

[57] ABSTRACT

A wiper pivot is provided with a pivot arm, a pivot shaft having a spherical convex part, and a pivot holder having a spherical concave part. The pivot shaft is supported rotatably by the pivot holder through the spherical connection, and an opening of the pivot holder is closed with a waterproof member made from elastic material. In this wiper pivot, it is possible to prevent the pivot shaft from rattling and prevent the pivot holder from the penetration of water.

3 Claims, 6 Drawing Sheets

FIG. 7
*(PRIOR ART)*
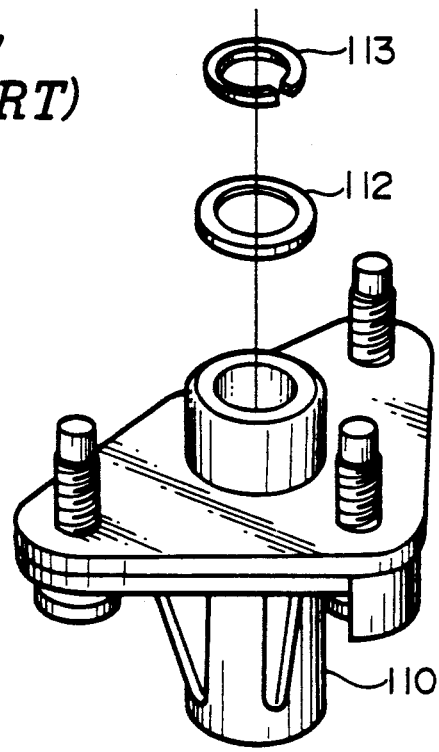
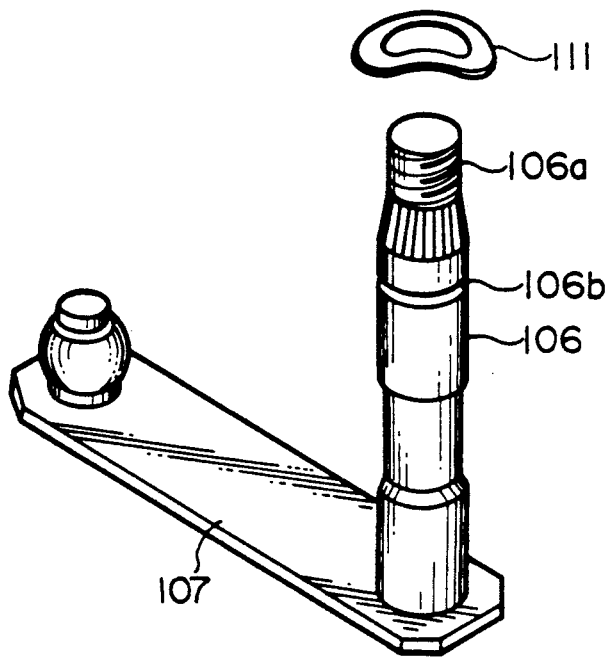

WIPER PIVOT

BACKGROUND OF THE INVENTION

1. Field of the Invention

This invention relates to a wiper device which wipes off raindrops, dust and the like on a surface of a windshield of an automobile for example, and especially, relates to a wiper pivot for moving a wiper arm with oscillatory motion in a prescribed wiping area.

2. Description of the Prior Art

Heretofore, there has been used a wiper device having a construction shown in FIG. 5 for example.

A wiper device 101 shown in FIG. 5 is provided with a motor 102 and wiper pivots 103 for making a wiper arm (not shown) wipe the windshield surface in the prescribed angular range, and is provided with a motor arm 105 which is fixed to an output shaft of the wiper motor 102 for converting rotary motion of the wiper motor 102 into reciprocative motion, a pivot arm 107 fixed to a pivot shaft 106, a first connecting rod 108 for giving the pivot arm 107 an oscillatory motion by interlocking the pivot arm 107 with said motor arm 105 and a second connecting rod 109 for interlocking each of pivot arms 107 of respective wiper pivot 103.

Said wiper pivot 103, as shown in FIG. 6 and FIG. 7, is provided with the pivot shaft 106 which is fixed with the pivot arm 107 at one end thereof and has a screw portion 106a to fix the wiper arm (not shown) by screw clamping, for converting reciprocative motion of the first connecting rod 108 into oscillatory motion of the wiper arm. A pivot holder 110 supports said pivot shaft 106 in rotatable state, with a wave washer 111 lying between the pivot arm 107 and the pivot holder 110 for preventing a rattling between the pivot arm 107 and the pivot holder 110 by the elastic force in the axial direction and also with a stop ring 113 which has been fitted into a groove 106b of the pivot shaft 106 so as not to come out from said pivot holder 110 through a washer 112 after inserting the pivot shaft 106 into the pivot holder 110.

Said wiper device 101 has a function to convert the rotary motion of the wiper motor 102 into the reciprocative motion by means of the motor arm 105 and the first connecting rod 108, and the reciprocative motion of said first connecting rod 108 is converted into the oscillatory-rotational motion of the wiper pivots 106 by the first connecting rod 108, the second connecting rod 109 and the respective pivot arms 107, so that raindrops, dust and the like existing on a surface of the windsheild are wiped off by the oscillatory motion of the respective wiper arm in the prescribed angular range.

In the wiper pivot 103 of the conventional wiper device 101 described above, there is a gap between the pivot holder 110 and the pivot arm 107 when the pivot shaft 106 is assembled into the pivot holder 110. Therefore, the pivot holder 110 is energized from the pivot arm 107 by setting the wave washer 111 into said gap in order to prevent a rattling caused by said gap when the wiper pivot 103 is mounted on a vehicle body. However, since said wave washer 111 does not have a waterproof function, rain water and the like may enter into the pivot holder 110 through the said gap, and rust formed on the pivot shaft 106 sometimes obstructs the rotation of said pivot shaft 106.

SUMMARY OF THE INVENTION

Therefore, it is an object of this invention to provide a wiper pivot to prevent the pivot shaft from rattling without using a wave washer, and to prevent the pivot holder from penetration of water.

The construction of the wiper pivot according to this invention for attaining the above-mentioned object is characterized by the following; a pivot shaft which is fixed with said pivot arm at one end thereof and fixed with a wiper arm at another end thereof, for converting reciprocative motion of a connecting rod connected to said pivot arm into oscillatory motion of the wiper arm, and a pivot holder for supporting said pivot shaft in rotatable state. The function is detailed as follows; the said pivot shaft being provided with a spherical convex part, said pivot holder being provided with a spherical concave part for fitting on the spherical convex part of said pivot shaft through a spherical connection, a rim portion having a plurality of cutout portions on the opening side said spherical concave part in the fitting direction of said pivot shaft and an annular projection formed on the outside of said rim portion through a groove, and an opening of said pivot holder being closed with a waterproof member made from elastic material.

In the wiper pivot according to this invention having aforementioned construction, inserting the pivot shaft into the pivot holder, the rim portion having cutout portions is spreaded out by inserting the pivot shaft, and so that the spherical convex part of the pivot shaft fits into the spherical concave part of the pivot holder. Thereby, the pivot holder is so constructed as to support the pivot shaft in the assembled state by the elasticity of said rim portion. And the wiper pivot according to this invention has a function of preventing the penetration of water into the pivot holder by closing the opening of the pivot holder with the water proof member.

BRIEF DESCRIPTION OF THE DRAWINGS

FIG. 7 is an exploded perspective view of FIG. 6.

DESCRIPTION OF THE PREFERRED EMBODIMENTS

Embodiments of the wiper pivot according to this invention will be described below on the basis of the drawings.

EMBODIMENT 1

Figure 1:
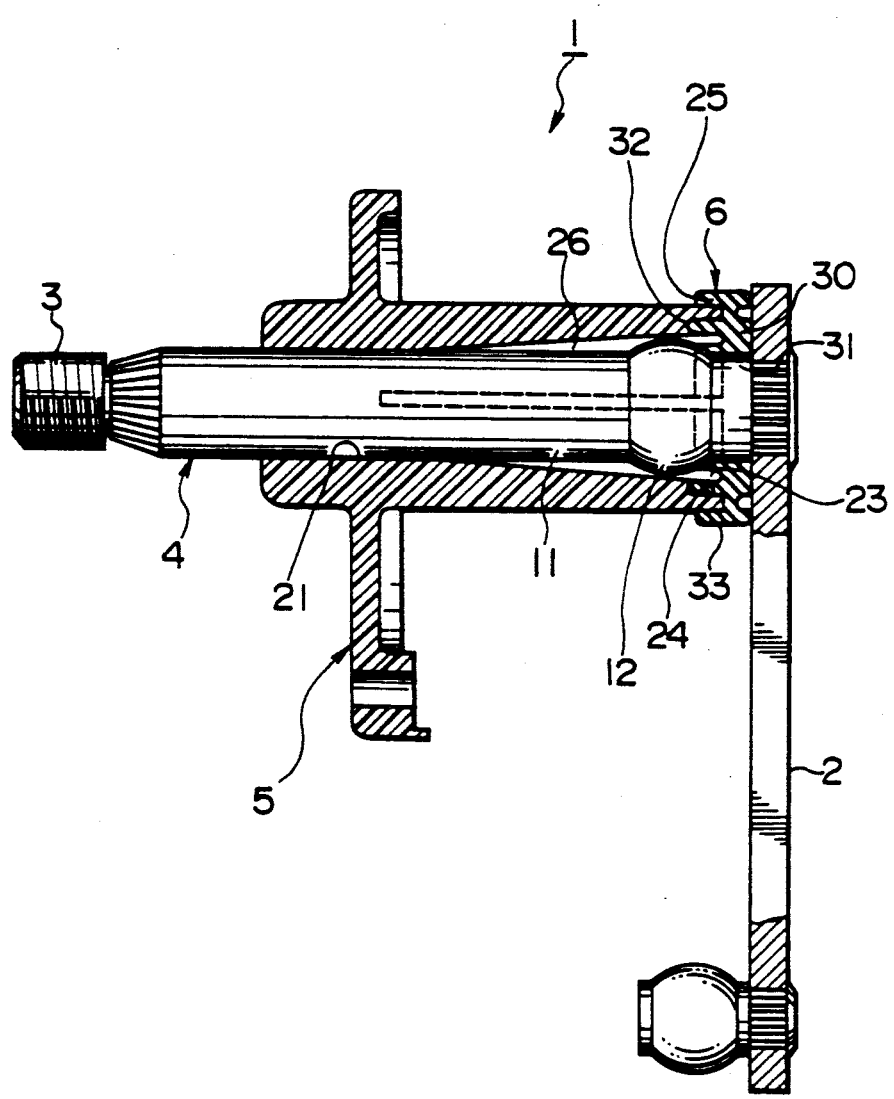
FIG. 1 is a sectional view illustrating the structure of an embodiment of the wiper pivot according to this invention.
Figure 2:
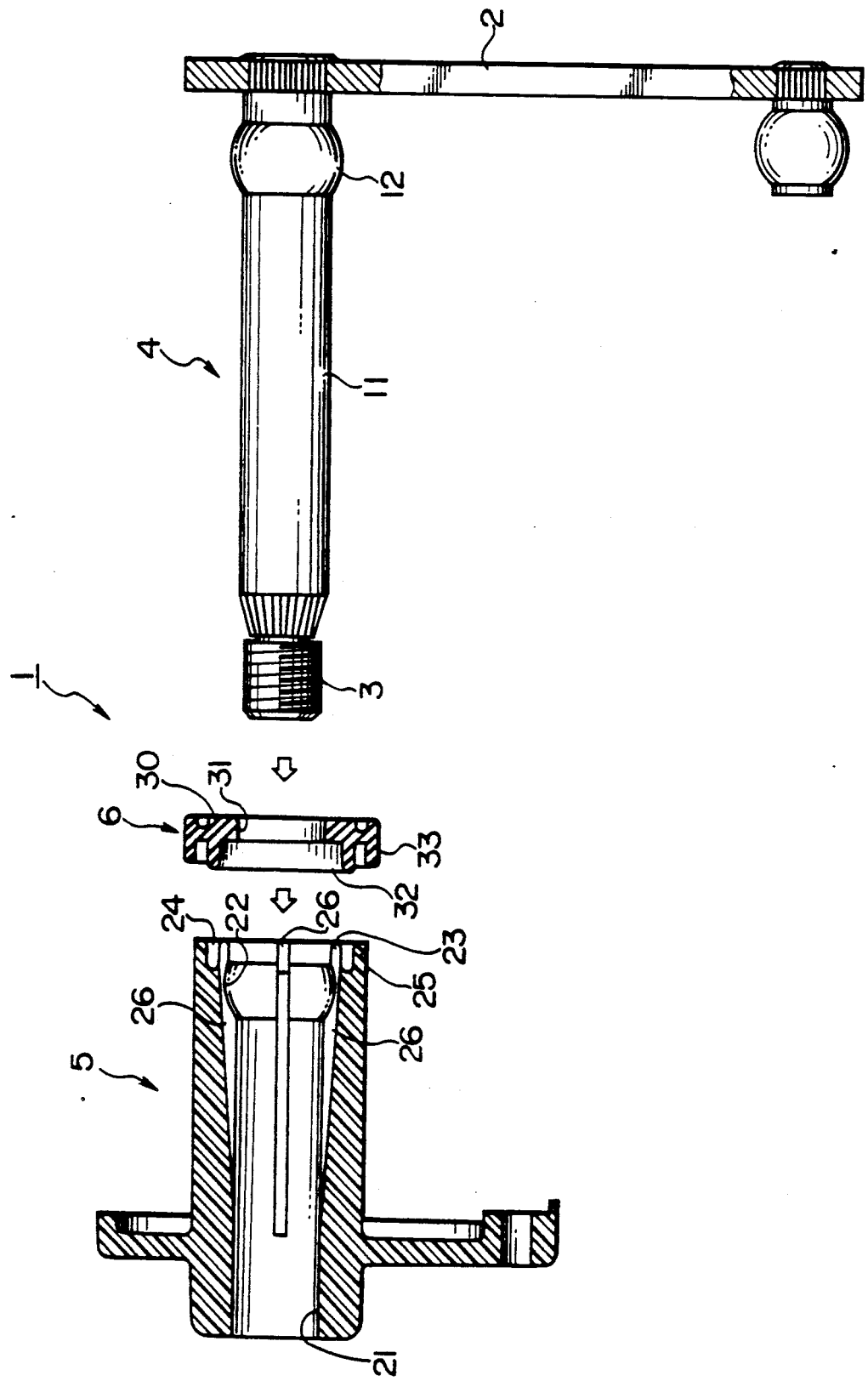
FIG. 2 is an exploded view of FIG. 1.
Figure 3:
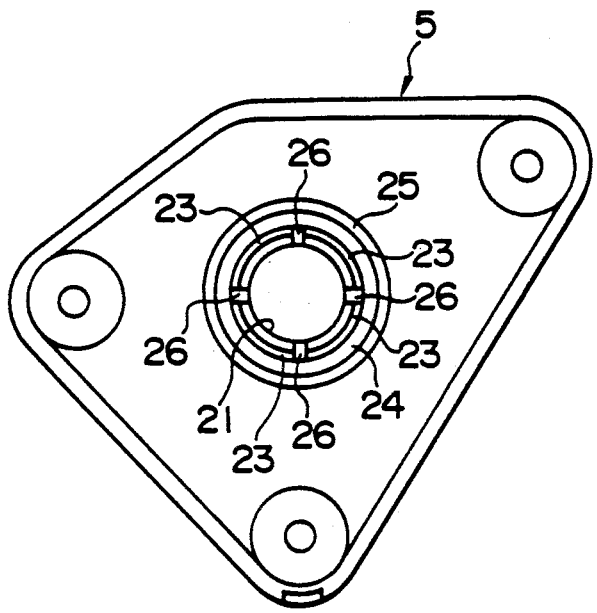
FIG. 3 is a right-side view of the pivot holder shown in FIG. 2.
Figure 5:
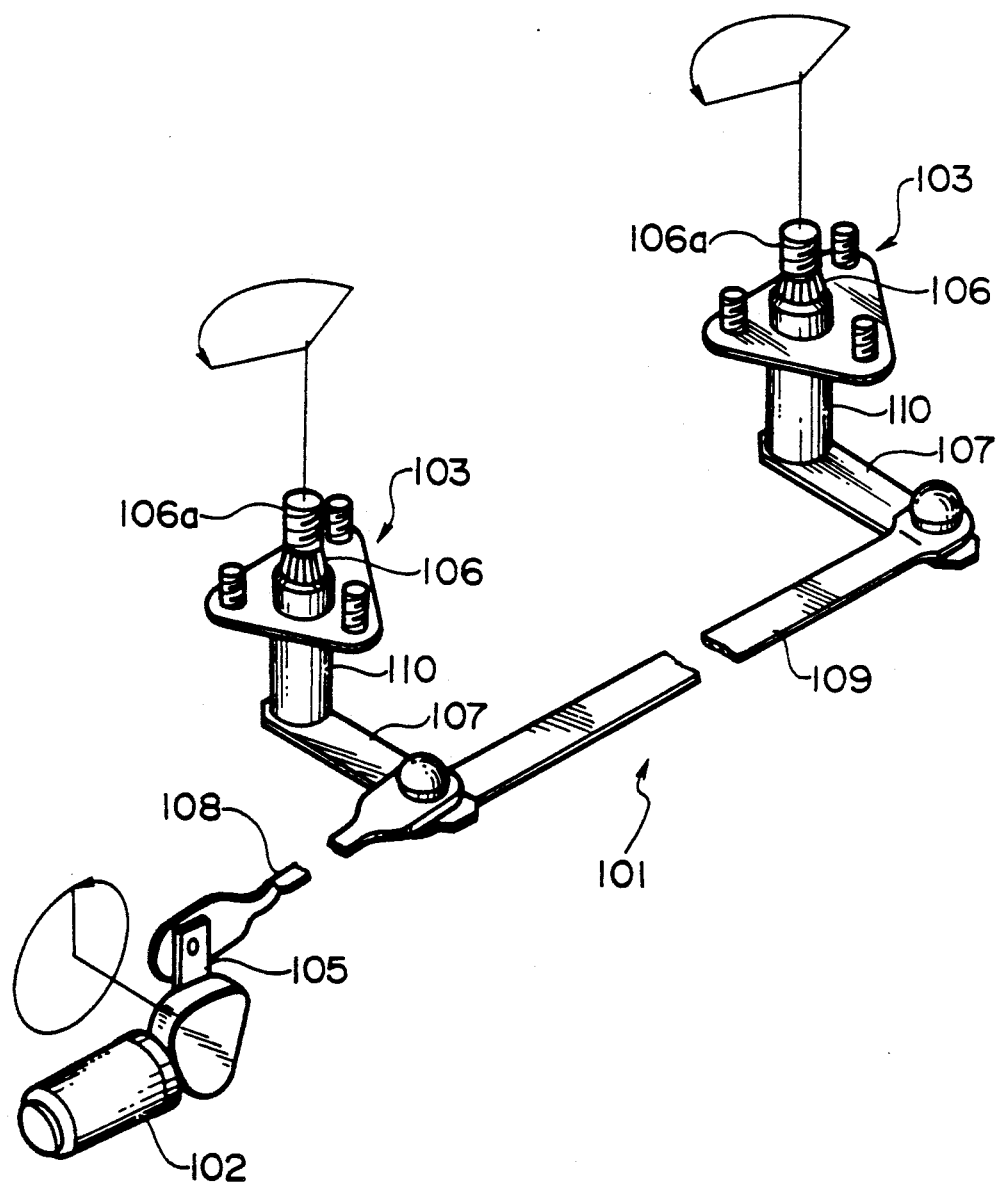
FIG. 5 is a perspective view illustrating the structure of the wiper device.
Figure 6:
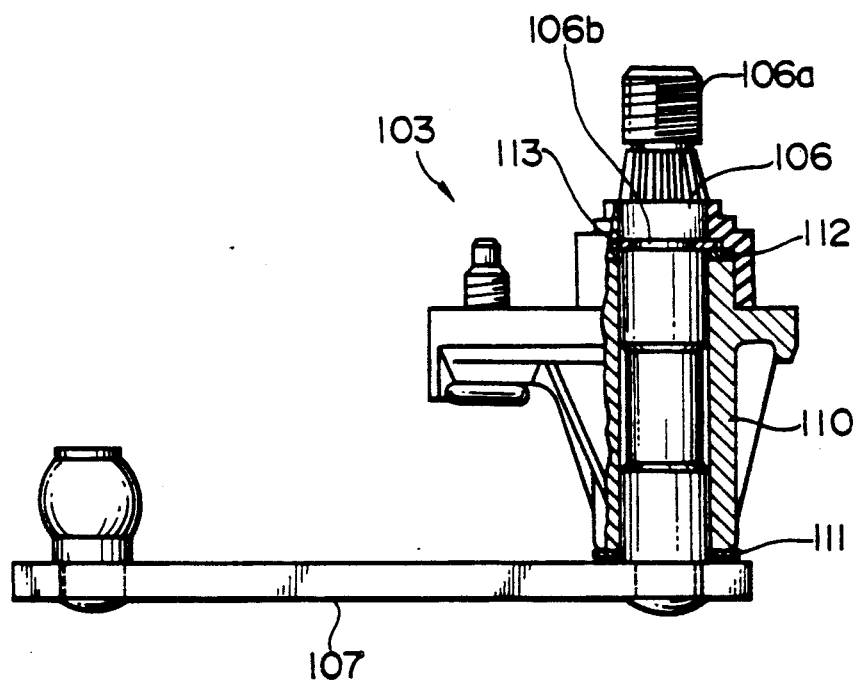
FIG. 6 is a partially sectional view illustrating the structure of the conventional wiper pivot.

FIGS. 1 to 3 show an embodiment of the wiper pivot according to this invention, and FIG. 1 is a sectional view illustrating the structure of the wiper pivot used for the wiper device 101 as shown in FIG. 5 which is explained in the "Description of The Prior Art".

In FIG. 1, numeral 1 is a wiper pivot, the wiper pivot 1 is explained by exemplifying the wiper pivot sitting on the right side in FIG. 5.

Said wiper pivot 1 is provided with a pivot arm 2 for converting reciprocative motion of the second connecting arm 109 shown in FIG. 5 into oscillatory motion of a wiper arm (not shown), a pivot shaft 4 fixed with said pivot arm 2 at one end thereof and provided with a screw portion 3 at another end thereof for fixing the wiper arm (not shown) by screw clamping, a pivot holder 5 for rotatably supporting said pivot shaft 4, and a waterproof member 6 for closing an opening of said pivot holder 5 on the side of the pivot arm 2.

Said pivot shaft 4 is, as also shown in FIG. 2, formed, together with a spherical convex part 12, by rolling one end of an axial part 11 adjacent the.

Said pivot holder 5 made of resinous material, as shown in FIG. 2 and FIG. 3, is provided with a through hole 21 for supporting said pivot shaft 4 in a rotatable state, a spherical concave part 22 provided at one end of said through hole 21 for fitting on the spherical convex part 12 of said pivot shaft 4 through a spherical connection, and a rim portion 23 formed on the side of the opening at one end of said spherical concave part 22. In addition, an annular projection 25 is provided on the outside of said rim portion 23 through a circular groove 24.

Said rim portion 23 is provided with four cutout portions 26 in the axial fitting direction of the pivot shaft 4 so that the rim portion may be spread outwardly by inserting the spherical convex part 12 of the pivot shaft 4 therein. Said cutout portions 26 serve to give a elasticity to the rim portion and to facilitate grease charging for lubricating the axial part 11 of the pivot shaft 4.

Said waterproof member 6 consists of a circular body 30 formed from elastic material. Said circular body 30 is provided, as shown also in FIG. 2, with a waterproof face 31 in contact rotatably with the axial part 11 of the pivot shaft 4, a projection 32 for fitting into the circular groove 24 of the pivot holder 5, and a rib portion 33 covering an outer periphery of the annular projection 25 of pivot holder 5. The waterproof member 6 serves to prevent the penetration of rain water and the like through the opening of said pivot holder 5 adjacent the pivot arm 2 when the pivot shaft 4 is inserted into the pivot holder 5.

Next assembling the wiper pivot 1 described above will be explained below.

The axial part 11 of the pivot shaft 4 is inserted into the through hole 21 of the pivot holder 4 in the direction of the arrow causing the lip portion 23 of the pivot holder 5 to spread out elastically by contact with the spherical convex part 12 of the pivot shaft 4 subsequent to fitting the waterproof member 6 on the cylindrical part 11 of the pivot shaft 4 between the convex part 12 and the pivot arm 2. By further inserting of the pivot shaft 4, the spherical convex part 12 of the pivot shaft 4 is fitted into the spherical concave part 22 of the pivot holder 5 to provide the spherical connection.

Thereupon, the projection 32 of the waterproof member 6 is fitted into the circular groove 24 of the pivot holder 5, and the rib portion 33 is in contact with the outer periphery of the annular projection 25.

Therefore, it becomes possible to connect the pivot shaft 4 to the pivot holder 5 by a "one-touch" operation. Since the waterproof face 31 of the waterproof member 6 is in contact tightly with the cylindrical part 11 of the pivot shaft 4 by its elasticity, it is possible to prevent the penetration of water through the contacting part even when the pivot shaft 4 rotates. Furthermore, it is possible to prevent the disconnection of the pivot shaft 4 from the pivot holder 5 because the water-proof member 6 restrains the lip portion 23 of the pivot holder 5 from spreading outwardly by fitting the projection 32 of the waterproof member 6 into the circular groove 24 of the pivot holder 5 when the pivot shaft 4 is inserted into the pivot holder 5.

EMBODIMENT 2

Figure 4:
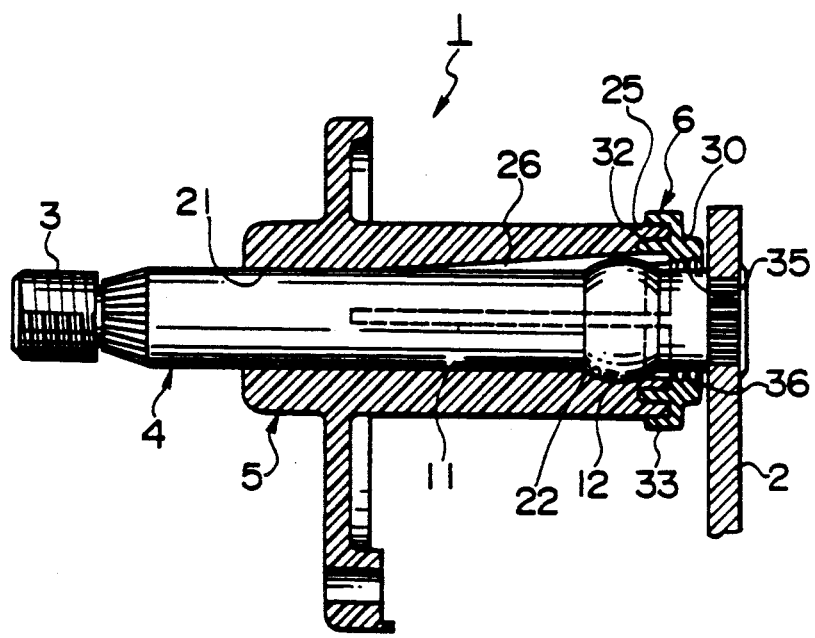
FIG. 4 is a sectional view illustrating the structure of another embodiment of the wiper pivot according to this invention.

FIG. 4 shows another embodiment of the wiper pivot according to this invention

A wiper pivot 4 shown in FIG. 1 is provided with a rib-like shaped waterproof face 35 at the contacting part of the waterproof member 6 which is in contact rotatably with the cylindrical part 11 of the pivot shaft 4.

Said waterproof face 35 is provided with triple circular lips 36 pressed onto the cylindrical part 11 of the pivot shaft 4 so that the circular lips 36 slide relative to the pivot shaft 4 by the elasticity of the inner periphery of circular body 30.

It is possible to prevent the the penetration of rain water and the like into the pivot holder 5 because the waterproof face 35 of the waterproof member 6 is in contact with the cylindrical part 11 of the pivot shaft 4, and it is possible to reduce the sliding resistance between the cylindrical part 11 of the pivot shaft 4 and the waterproof face 35 of the waterproof member 6 by the action of the circular lips 36 of the waterproof face 35 at the time of rotation of the pivot shaft 4.

Although, the waterproof face 35 having triple circular lips 36 is exemplified in aforementioned Embodiment 2, the number of the circular lips 36 is not limited to three so long as they are effective for waterproofing the inner part of the pivot holder 5.

Furthermore, the pivot holder 5 having four cutout portions 26 is exemplified in aforementioned Embodiments 1 and 2, however, since the rim portion 23 is provided with the cutout portions 26 in order to obtain the elasticity, the number of the cutout portions 26 should be selected on the basis of the diameter and the required deformation of the rim portion 23.

As described above, the wiper pivot according to this invention has a pivot arm, a pivot shaft which is fixed with said pivot arm at one end thereof and fixed with a wiper arm at another end, for converting reciprocative motion of a connecting rod connected to said pivot arm into oscillatory motion of the wiper arm, and a pivot holder for supporting said pivot shaft rotatably, said pivot shaft is provided with a spherical convex part, said pivot holder is provided with a spherical concave part for fitting on the spherical convex part of said pivot shaft through a spherical connection, a lip portion having a plurality of cutout portion on the opening side of said spherical concave part in the fitting direction of said pivot shaft and an annular projection formed on the outside of said lip portion through a groove, and opening of said pivot holder is closed with a waterproof member made from elastic material. Therefore, through the spherical connection obtained by fitting the spherical convex part of the pivot shaft into the spherical concave part of the pivot holder, it becomes possible to prevent the pivot shaft from rattling without using a wave washer. An excellent effect has also been obtained in the point of rain water proofing.

What is claimed is:

1. A wiper pivot for converting reciprocative motion of a connecting rod driven by a drive means into oscillatory motion of a wiper arm, comprising:
   a pivot arm;
   a pivot shaft connected to said pivot arm at one end thereof and adapted to be connected to the wiper arm at an opposite end thereof for converting said reciprocative motion of the connecting rod connected to said pivot arm into said oscillatory motion of the wiper arm, said pivot shaft being provided with a spherical convex part; and
   an elongated pivot holder with a longitudinally extending through hole for rotatably supporting said pivot shaft therein, said pivot holder including a spherical concave part at one end thereof for fitting on the spherical convex part of said pivot shaft to provide a spherical connection, an annular lip portion extending axially outwardly from said end and having a plurality of cut-out portions adjacent an open end of said spherical concave part in the fitting direction of said pivot shaft and an axially extending annular projection formed radially outwardly but spaced from said lip portion, an annular groove formed therebetween; and
   a waterproof member made from elastic material and having a projection fitted into said annular groove of said pivot holder to cover said open end of said pivot holder and prevent outward movemet of said lip portion to retain said spherical convex part of said pivot shaft in said spherical concave part of said pivot holder.

2. A wiper pivot as set forth in claim 1, wherein said waterproof member has an interior surface disposed in rotatable watertight contact with said pivot shaft adjacent said spherical convex part.

3. A wiper pivot as set forth in claim 2, wherein said interior surface has a plurality of circular lips pressed onto said pivot shaft.

* * * * *